United States Patent
Kra (10) Patent No.: US 8,250,347 B2
(45) Date of Patent: Aug. 21, 2012

(54) DIGITAL DATA PROCESSING APPARATUS HAVING HARDWARE MULTITHREADING SUPPORT INCLUDING CACHE LINE LIMITING MECHANISM FOR SPECIAL CLASS THREADS

(75) Inventor: David Alan Kra, West Orange, NJ (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/923,455

(22) Filed: Oct. 24, 2007

(65) Prior Publication Data

US 2008/0040583 A1  Feb. 14, 2008

Related U.S. Application Data

(62) Division of application No. 11/290,887, filed on Nov. 30, 2005, now Pat. No. 7,624,257.

(51) Int. Cl.
G06F 7/38 (2006.01)
G06F 9/00 (2006.01)
G06F 9/44 (2006.01)
G06F 13/00 (2006.01)
G06F 13/28 (2006.01)
G06F 9/46 (2006.01)

(52) U.S. Cl. .......... 712/228; 718/104; 711/129

(58) Field of Classification Search .......... 718/104
See application file for complete search history.

(56) References Cited

U.S. PATENT DOCUMENTS

| | | | | | |
|---|---|---|---|---|---|
| 5,197,138 | A | * | 3/1993 | Hobbs et al. | 712/222 |
| 6,938,252 | B2 | * | 8/2005 | Baylor et al. | 718/102 |
| 7,080,379 | B2 | * | 7/2006 | Brenner et al. | 718/105 |
| 7,103,735 | B2 | * | 9/2006 | Iyer | 711/158 |
| 2002/0007441 | A1 | * | 1/2002 | Palanca et al. | 711/133 |
| 2004/0268093 | A1 | * | 12/2004 | Samra et al. | 712/217 |
| 2005/0114605 | A1 | * | 5/2005 | Iyer | 711/133 |
| 2005/0154860 | A1 | * | 7/2005 | Arimilli et al. | 712/216 |
| 2006/0036810 | A1 | * | 2/2006 | Accapadi et al. | 711/132 |

FOREIGN PATENT DOCUMENTS

| CN | 1469246 A1 | 1/2004 |
|---|---|---|
| CN | 1577260 A | 2/2005 |
| CN | 1645341 A | 7/2005 |

* cited by examiner

Primary Examiner — Eddie P Chan
Assistant Examiner — William Partridge
(74) Attorney, Agent, or Firm — Roy W. Truelson (57) ABSTRACT

Asymmetric hardware support for a special class of threads is provided. Preferably, the special class threads are high-priority, I/O bound threads. Preferably, a multithreaded processor contains N sets of registers for supporting concurrent execution of N threads. At least one of the register sets is dedicated for use by a special class of threads, and can not be used by other threads even if idle. The special class of threads can fill only the a limited portion of the cache memory, in order to reduce flushing of the cache which might otherwise occur.

19 Claims, 5 Drawing Sheets

DIGITAL DATA PROCESSING APPARATUS HAVING HARDWARE MULTITHREADING SUPPORT INCLUDING CACHE LINE LIMITING MECHANISM FOR SPECIAL CLASS THREADS

CROSS REFERENCE TO RELATED APPLICATION

This is a divisional application of U.S. patent application Ser. No. 11/290,887, filed Nov. 30, 2005, entitled "Digital Data Processing Apparatus Having Asymmetric Hardware Multithreading Support for Different Threads", which is herein incorporated by reference. This application claims priority under 35 U.S.C. §120 of U.S. patent application Ser. No. 11/290,887, filed Nov. 30, 2005.

FIELD OF THE INVENTION

The present invention relates to digital data processing hardware, and in particular to the design and operation of digital data processing hardware for supporting the concurrent execution of multiple threads within a processing unit of a digital data processing device.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant clock speed improvements by shrinking and combining components, eventually packaging the entire processor as an integrated circuit on a single chip, and increased clock speed through further size reduction and other improvements continues to be a goal.

In addition to increasing clock speeds, it is possible to increase the throughput of an individual CPU or a system by increasing the average number of operations executed per clock cycle. Modern computer systems are designed to perform many operations concurrently, in order to increase the average number of operations executed in a given time. Parallelism of various types is a common technique for boosting system throughput. For example, the reduced size and cost of individual processors has made it feasible, indeed common, to provide multiple CPUs operating in parallel in a single computer system.

One particular form of parallelism in computer design is the use of hardware multithreading within a computer processor. The term "multithreading", as used in the context of processor design, is not the same as the software use of the term, and for this reason the phrase "hardware multithreading" is often used to distinguish multithreading in the context of processor design from "multithreading" or "multiprogramming" in the context of software. The software use of the term means that a single process or task is subdivided into multiple related threads, which are capable of being dispatched independently for execution. Hardware multithreading involves the concurrent execution of multiple software threads within a single processor. These threads may represent completely independent tasks which are unrelated to one another. As used herein, the term "multithreading" refers to hardware multithreading, unless otherwise qualified.

A processor which supports hardware multithreading can support multiple active threads at any instant in time. I.e., the dispatcher in the operating system can dispatch multiple threads to the same processor concurrently. From the perspective of the operating system, it appears that there are two processors, each executing a respective thread. There are multiple approaches to hardware multithreading. In a more traditional form, sometimes called "fine-grained multithreading", the processor executes N threads concurrently by interleaving execution on a cycle-by-cycle basis. This creates a gap between the execution of each instruction within a single thread, which tends to reduce the effect of waiting for certain short term latency events, such as waiting for a pipeline operation to complete. A second form of multithreading, sometimes called "coarse-grained multithreading", multiple instructions of a single thread are executed exclusively until the processor encounters some longer term latency event, such as a cache miss, at which point the processor switches to another thread. In a third form of multithreading, herein referred to as "dynamic multithreading", an instruction unit in the processor selects one or more instructions from among multiple threads for execution in each cycle according to current processor and thread state.

Regardless of the type of hardware multithreading employed, all hardware multithreading tends to increase the productive utilization of certain processor resources because one or more active threads can exploit processor resources to execute instructions even while other threads are stalled, as for example, when waiting for a cache line to be filled. I.e., in a processor which supports only a single thread, some processing resource, such as a pipeline, may have to wait idle on any of numerous latency events. However, if multiple threads are active in the processor, the probability that the resource can be utilized in increased. Put another way, a multithreaded processor increases the average number of operations executed per clock cycle in comparison to a similar processor which supports only a single thread.

Typically, hardware multithreading involves replicating certain processor registers for each thread in order to independently maintain the states of multiple threads. For example, for a processor implementing a PowerPC™ architecture to perform multithreading, the processor must maintain N states to run N threads. Accordingly, the following are replicated N times: general purpose registers, floating point registers, condition registers, floating point status and control register, count register, link register, exception register, save/restore registers and special purpose registers. Additionally, certain special buffers, such as a segment lookaside buffer, can be replicated or each entry can be tagged with a thread number. Also, some branch prediction mechanisms, such as the correlation register and the return stack, should also be replicated. However, larger hardware structures such as caches and execution units are typically not replicated, and are shared by all threads.

Thus, it can be seen that hardware multithreading involves replication of hardware in the form of additional registers and other structures needed to maintain state information. While the number of threads supported can vary, each thread requires additional hardware resource which must be justified by the increase in utilization of the shared hardware resources, such as execution units. The marginal improvement in utilization declines as more threads are added and the shared hardware resources become more fully utilized, while the cost of each additional thread is relatively constant. Therefore the number of threads supported in most hardware multithreading processors is relatively small, with two being a common number.

In many system architectures, certain threads representing interrupts and other special processes run at a high priority. A particular example is input/output (I/O) bound threads, i.e., threads which service I/O processes. Generally, these threads spend most of their time in a wait state waiting for I/O completion, and when executing, execute often, but only briefly and do not require large hardware resource. When such a thread is waiting on an event and the event occurs, the operating system dispatcher often dispatches the thread immediately to a processor (due to its high priority), causing some currently executing thread to be pre-empted.

Although each I/O bound thread may execute only briefly when dispatched, the cumulative effect of numerous high-priority pre-emptions can reduce the efficiency of system operation. There is some overhead involved in pre-empting a currently executing thread, saving its state, and dispatching the I/O bound thread to the processor, and multiplied by many such events this becomes significant additional work. Additionally, a high priority thread has a tendency to flush the contents of cache, even when executing only briefly. I.e., it will fill the cache, and particularly the high-level cache nearest the processor, with data it requires, resulting in the removal of data needed by other threads.

It is desirable to find improved techniques for processor operation and design which will avoid or mitigate some of the undesirable side effects of servicing such high-priority threads.

SUMMARY OF THE INVENTION

In an aspect of the preferred embodiment of the present invention, a special class of threads is limited in its use of cache memory. Threads of the special class can fill only the a limited portion of the cache memory, in order to reduce flushing of the cache which might otherwise occur.

In the preferred embodiment, a processor supports three sets of registers, of which one is dedicated for use by the special class of threads. Preferably, this special class comprises high-priority threads which typically execute only briefly, and in particular includes I/O bound threads. In general, it is expected that the dedicated register set will be idle most of the time. When a special class thread is dispatched, its state is maintained in the dedicated register set. The special class thread is further limited in the number of cache lines that it can fill in the L1 I-cache and L1 D-cache. Preferably, the caches are N-way associative, and some limited number of cache lines in each associativity set is available for use by the special class thread. The special class thread can load data only to this limited portion of cache, preventing it from flushing the full contents of cache.

In the preferred embodiment, the processor operates as a dynamic multithreaded processor in which the instruction unit selects instructions for execution based on thread priority, the special class of threads having the highest priority. I.e., the instruction unit selects instructions for execution from the highest priority thread, to the extent there are instructions available for immediate execution, and selects instructions from the lower priority threads to the extent higher priority thread instructions are not immediately ready to execute. However, alternative forms of multithreading could be used.

Preferably, the operating system's dispatcher dispatches threads according to membership in the special class, indicating to the processor whether or not a dispatched thread is to execute in the special class register set.

Although it might be supposed that restricting one of N register sets to a certain class of threads, resulting in the register set being inactive most of the time, would be less efficient than allowing any thread to execute in any register set of N sets (increasing the utilization of the register sets), this is not necessarily the case. As the number of register sets N grows, the lower priority register sets execute with less frequency, so that the benefit of an Nth set becomes problematical. By establishing a special register set for certain high-priority threads, which generally execute often, but only briefly, a dispatched special thread typically displaces an inactive special thread in the processor's registers. There is no need to swap out an active, general-purpose thread, and then swap it back in when the special thread relinquishes the processor. This reduces the volume of context change activity in the operating system suffered by the general purpose threads. This reduction in context change workload can more than offset the fact that the special register set is idle most of the time. Furthermore, by limiting the number of cache lines available to the special threads (which generally don't need very many cache lines anyway), these threads are effectively prevented from flushing the cache during their brief periods of execution, thus reducing disruption to other active threads.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
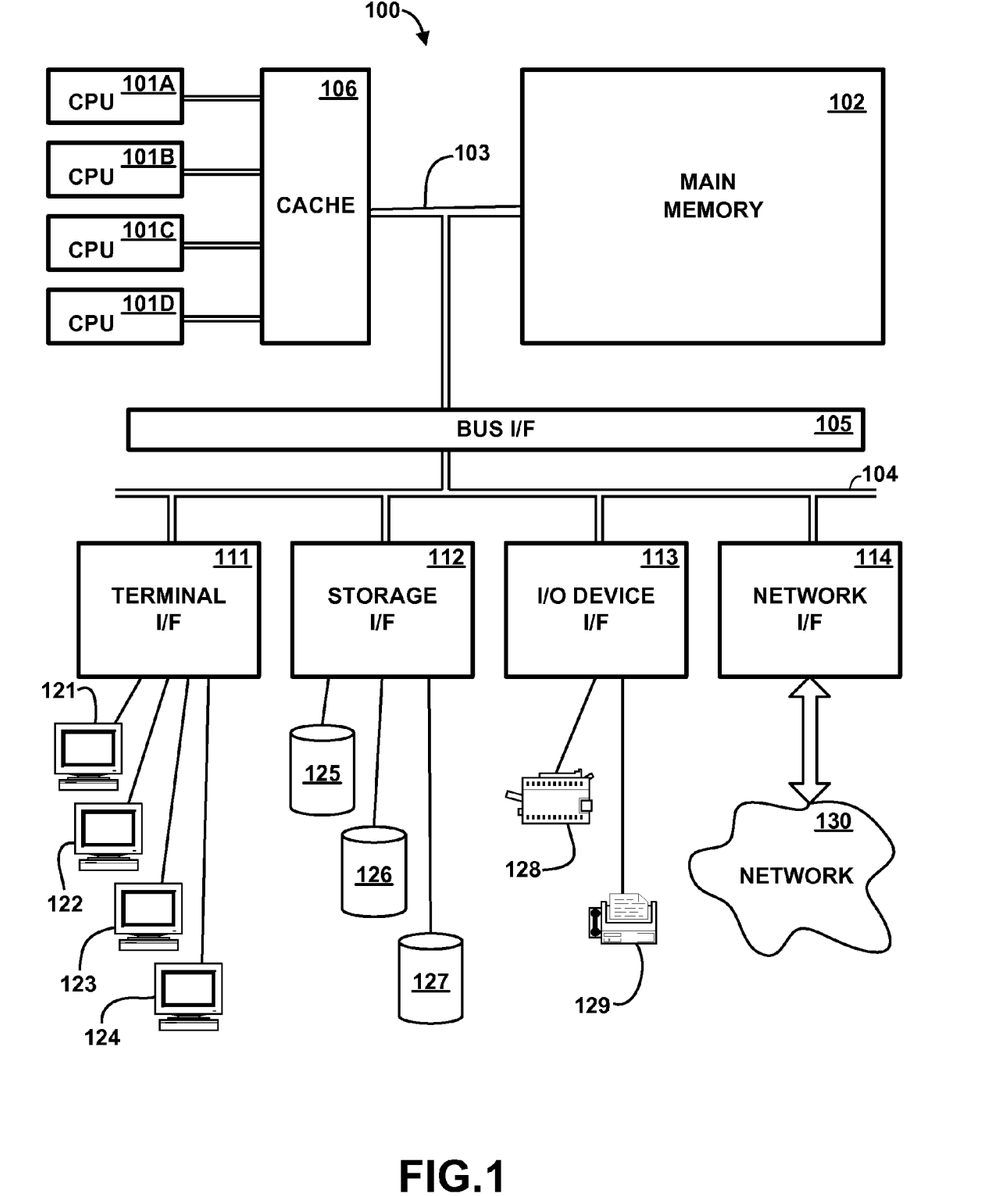
FIG. 1 is a high-level block diagram of the major hardware components of a computer system utilizing asymmetric hardware multithreading support for different threads, according to the preferred embodiment of the present invention.

Referring to the Drawing, wherein like numbers denote like parts throughout the several views, FIG. 1 is a high-level representation of the major hardware components of a computer system 100 which utilizes asymmetric hardware multi-threading support for different threads, according to the preferred embodiment of the present invention. The major components of computer system 100 include one or more central processing units (CPU) 101A-101D, main memory 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A-101D, herein generically referred to as feature 101. In the preferred embodiment, system 100 contains multiple processors typical of a relatively large system; however, system 100 could alternatively be a single CPU system. Each processor 101 concurrently executes instructions stored in memory 102 on behalf of multiple active threads. Instructions and other data are loaded into cache memory 106 from main memory 102 for processing. Main memory 102 is a random-access semiconductor memory for storing data, including programs. Although main memory 102 and cache 106 are represented conceptually in FIG. 1 as single entities, it will be understood that in fact these are more complex, and in particular, that cache exists at multiple different levels, as described in greater detail herein. Likewise, while some levels of cache may be shared among multiple CPUs as depicted in FIG. 1, other levels of cache may comprise multiple cache arrays, each closely coupled to a single CPU.

Buses 103-105 provide communication paths among the various system components. Memory bus 103 provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111-114, which are also known as I/O processors (IOPs) or I/O adapters (IOAs), through system I/O bus 104. System I/O bus may be, e.g., an industry standard PCI bus, or any other appropriate bus technology.

I/O interface units 111-114 support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. It will further be understood that not all components shown in FIG. 1 may be present in a particular computer system. Several particular examples of such additional complexity or additional variations are disclosed herein, it being understood that these are by way of example only and are not necessarily the only such variations.

Although main memory 102 is shown in FIG. 1 as a single monolithic entity, memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among cache 106, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
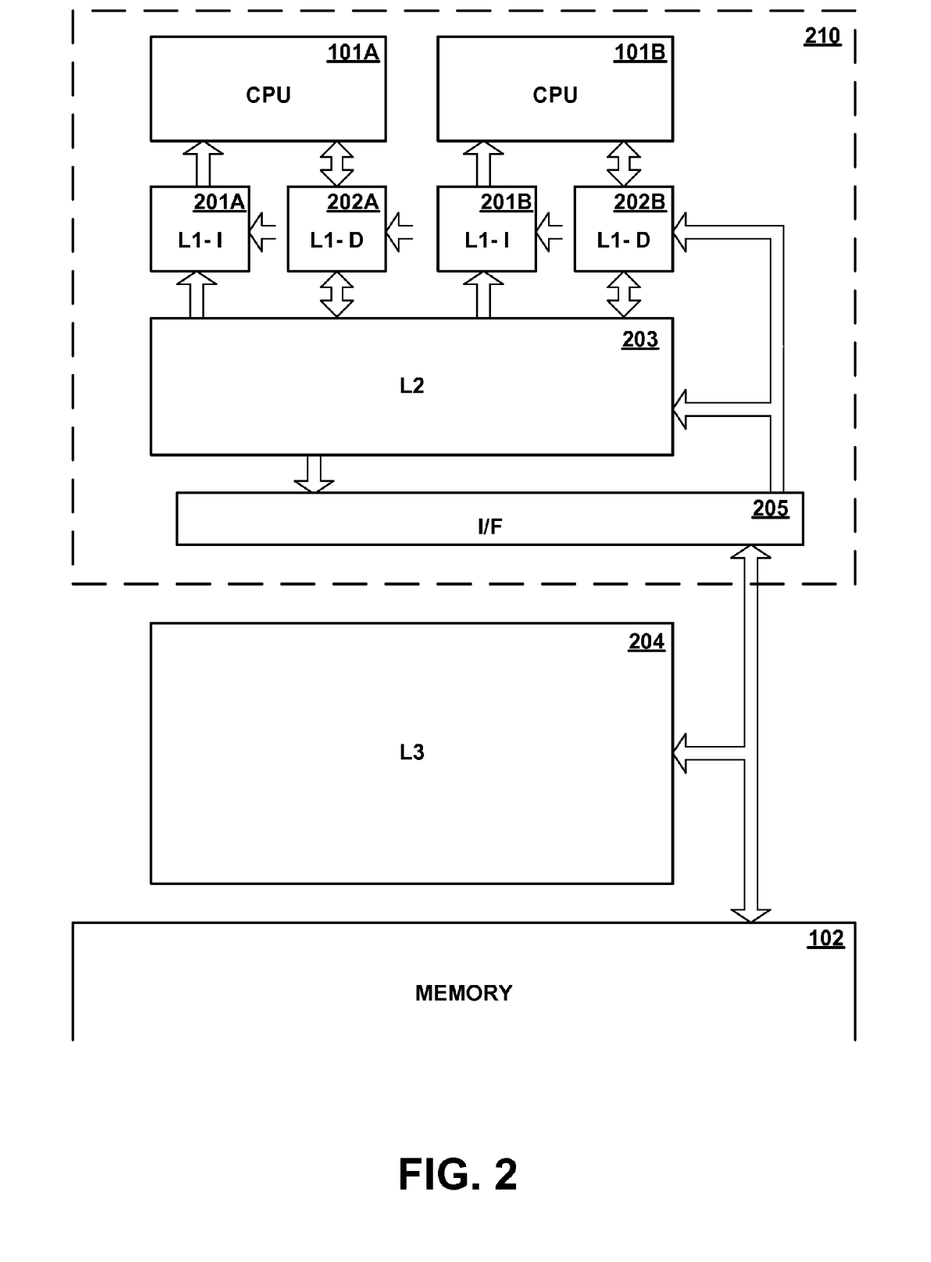
FIG. 2 represents in greater detail a hierarchy CPUs and various levels of cache for temporarily storing portions of main memory, according to the preferred embodiment.

FIG. 2 represents in greater detail a hierarchy CPUs and various levels of cache for temporarily storing portions of main memory 102, according to the preferred embodiment. In this embodiment, there is a hierarchy of caches at levels designated level 1 (the highest level), level 2, and level 3, in addition to main memory. In general, caches become faster, and store progressively less data, at the higher levels (closer to the processor). Each processor 101 is associated with a respective pair of level 1 caches, which is not shared with any other processor. One cache of this pair is a level 1 instruction cache (L1 I-cache) 201A, 201B (herein generically referred to as feature 201) for storing instructions for execution on the associated processor 101. The other cache of the pair is a level 1 data cache (L1 D-cache) 202A, 202B (herein generically referred to as feature 202) for storing data (other than instructions) to be processed by threads executing on the associated processor 101. Each processor is further associated with a respective level 2 cache 203 and a level 3 cache 204, which can generally store any form of data from memory 102. Each pair of Level 1 caches 201, 202 is preferably dedicated to a single corresponding processor; each L2 cache 203 and each L3 cache 204 is typically shared among multiple processors, although one or more of such caches could alternatively be dedicated to single respective processors. For clarity of illustration, FIG. 2 shows only two processors 101, two pairs of L1 caches 210, 202, one L2 cache 203 and one L3 cache 204, but the number of processors and caches at various levels of system 100 could vary, and the number of processors sharing a cache at each of the various levels could also vary. It should further be understood that the number of cache levels could vary and that the L1 caches needn't be divided into separate instruction and data caches, and there could be more or fewer than three levels of cache.

FIG. 2 is intended to depict certain functional relationships among the various caches, and the fact that certain components are shown separately is not intended as a representation of how the components are packaged. Modern integrated circuit technology has advanced to the point where at least some cache is typically packaged on the same integrated circuit chip as a processor (sometimes also referred to as a processor core, to distinguish it from caches and other mechanisms). Typically, the L1 caches 201, 202 are packaged on the same integrated circuit chip as the processor, and may be considered part of the processor. It is even possible to place multiple processor cores on a single chip, with a certain amount of shared cache. For example, in the embodiment represented in FIG. 2, a pair of CPUs 101A, 101B, together with a pair of respective L1 I-caches 201A, 201B, a pair of respective L1 D-caches 202A, 202B, and a single L2 cache 203 which is shared by both processors 101A, 101B, are packaged on a single integrated circuit chip 210. The L3 cache 204 is typically a separate integrated circuit chip or chips mounted on a common circuit package along with the corresponding processor chip. However, this arrangement is only one possible packaging arrangement, and as integrated circuit and other electronics packaging technology evolves it is conceivable that further integration will be employed.

Chip 210 includes a bi-directional external data communications interface 205 for handling data communications with system components external to chip 210. Data paths exists between main memory 102, L3 cache 204, and chip external data interface 205, and between interface 205, between L2 cache 203 and L1 caches 201, 202. Although FIG. 2 represents data paths conceptually as direct paths, they may in fact be implemented as multiple successive buses or similar data paths.

Figure 3:
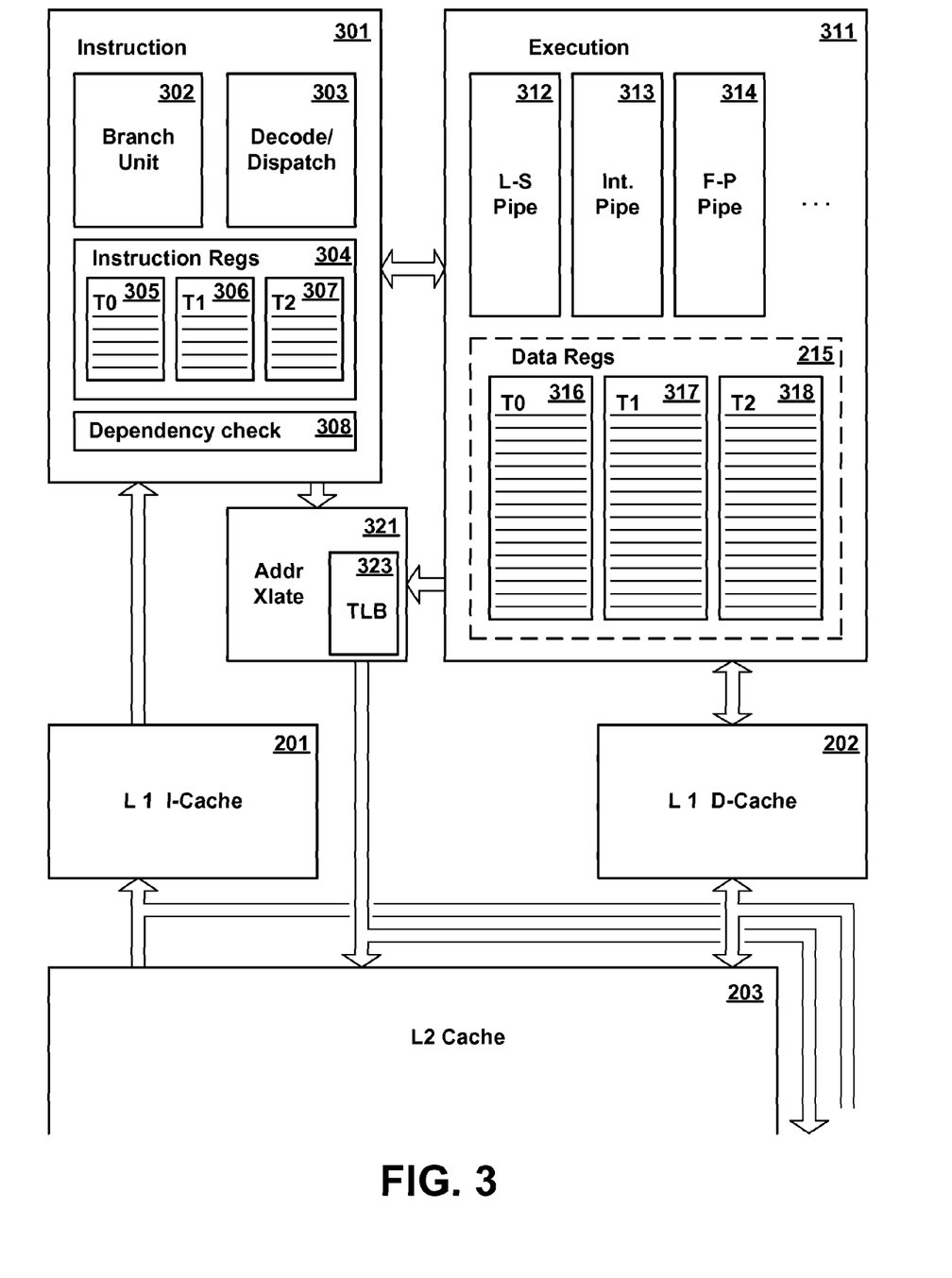
FIG. 3 is a high-level diagram of the major components of a CPU including certain associated cache structures, according to the preferred embodiment.

FIG. 3 is a high-level diagram of the major components of CPU 101 including certain associated cache structures, according to the preferred embodiment, showing CPU 101 in greater detail than is depicted in FIG. 1 or 2. CPU 101 includes instruction unit portion 301 and execution unit portion 311. In general, instruction unit 301 obtains instructions from L1 I-cache 201, selects and decodes instructions to dispatch to the execution unit, and resolves branch conditions to control program flow. Execution unit 311 performs arithmetic and logical operations on data in registers, and loads or stores data from L1 D-Cache 202. CPU 101 further includes address translation unit 322.

In this embodiment, CPU supports the concurrent execution within processor 101 of up to three independent threads, it being understood that the number of threads supported could vary. Specifically, CPU maintains state of up to three active threads, any of which may utilize hardware resources of the processor. In order to maintain state of three active threads, certain registers or portions thereof which maintain state information are replicated for each thread. The active threads are herein designated threads 0, 1 and 2 (T0, T1 and T2), where T0 is the highest priority thread and T2 the lowest. Thread T0 is reserved for use by threads of a special class, which are typically I/O bound threads and certain other threads. Threads of this special class generally spend most of their time in a wait state in the operating system, waiting on some event (such as an I/O interrupt). When dispatched to a processor for execution, they should execute at a high priority. Typically, execution is brief, and the thread then returns to the wait state. The operating system's dispatcher indicates whether a dispatched thread should execute as thread T0 (a special thread) or as one of the other general threads.

Instruction unit 301 comprises branch unit 302, instruction decode/dispatch unit 303, and a set of instruction registers (also known as instruction buffers) 304. Instructions from L1 I-cache 201 are loaded into buffers 304 prior to execution. In the preferred embodiment, the instruction unit includes three subsets of instruction buffers 305-307, each subset being the same size and corresponding to a respective thread supported by the processor. Decode/dispatch unit 203 selects one or more instructions to be dispatched for execution from buffers 204 in a current machine cycle, and decodes the instruction(s) to determine the operation(s) to be performed or branch conditions. Branch unit 202 controls the program flow by evaluating branch conditions, and refills buffers 204 from L1 I-cache 221.

Execution unit 211 comprises multiple execution pipelines 312-314. FIG. 3 represents a load-store pipeline 312, an integer arithmetic/logic pipeline 313, and a floating point pipeline 314. Although three representative pipelines are illustrated in FIG. 3, it should be understood that the number of pipelines may vary, and that there may be multiple pipelines of the same type. Each pipeline performs a defined operation or set of operations on data in multiple stages corresponding to machine cycles. As is known in the art, data for an operation is introduced into the pipeline in a first machine cycle, and advances one stage in the pipeline in each succeeding cycle. Provided that a pipeline is always full, it can perform an average of one operation per cycle, no matter how many stages it takes to complete the operation (although in fact it is impossible to keep the pipeline full at all times).

Execution unit 211 further includes a set of general purpose data registers 215 for storing data to be processed in pipelines 312-314 according to instructions from instruction unit 301. The general purpose data registers include three subsets 316-318, each subset being the same size and corresponding to a respective thread supported by the processor. For clarity of illustration, each subset 316-318 of data registers is represented as a single collection of registers of equal size. However, in many processor architectures, data registers include a set of integer data registers and a separate set of floating point data registers, the latter often being longer. Where the processor architecture supports both integer and floating point registers, each subset 316-318 includes the full complement of integer and floating point registers. Where the processor implementation includes more registers than the processor architecture, extras may be assigned to one particular subset 316-318 or shared among them.

In addition to components shown in FIG. 2, processor 101 may include any of various special-purpose registers, such as machine state registers, condition registers, status registers and so forth (not shown). Where special purpose registers contain state information specific to a thread, this thread-specific information is replicated for each of the threads supported by the processor.

Address translation unit 321 translates addresses generated by instruction unit 201 or execution unit 211 (typically referred to as "virtual addresses" or "effective addresses") to corresponding addresses in memory 102 (typically referred to as "real addresses" or "physical addresses"). Address translation unit preferably includes translation look-aside buffer (TLB) 322, which is effectively a cache of certain address translation data from a page table in memory, and may include other data as well. Depending on the architecture, address translation may be dependent on the thread which generated the address. If this is the case, each TLB entry contains a thread identifier which identifies the thread to which the TLB entry corresponds.

In the preferred embodiment, L2 cache 203 and L3 cache 204 are addressed using real addresses, while L1 caches 201, 202 are addressed using effective addresses. The use of real addresses to access cache necessarily means that addresses for data access must be translated by address translation unit 321 before accessing cache, but has significant advantages in other respects, particularly in maintaining cache coherency where a system has multiple processors and caches. Accessing caches using real vs. effective addresses is an architectural design choice involving many factors, and some system architectures use exclusively real addresses to access all caches, some use exclusively effective addresses, and some use effective addresses for certain caches (higher-level caches) and real addresses for others. Although a particular embodiment is described herein, the present invention is not limited to any particular architecture, and could be employed in systems using any of these variations.

In operation, decode/dispatch unit 303 selects instructions from registers 304 for dispatch to execution unit 311. Each instruction executed in CPU 101 performs a single primitive operation, such as a load, a store, an integer arithmetic or logical operation, a floating point operation, a branch, etc. Decode/dispatch unit 303 can simultaneously dispatch multiple such instructions in a single machine cycle, and these instructions may be from the same thread or from different threads. Dispatch is the initial stage in processing the instruction. In the case of instructions dispatched to a pipeline 312-314 of the execution unit, the instruction may take multiple machine cycles to complete, and other instructions may be dispatched to the same pipeline in subsequent cycles.

Decode/dispatch unit 303 selects instructions for dispatch based on thread priority. If a hardware processing resource, such as a pipeline, is available to receive an instruction, and there is an available instruction in the T0 buffers 305 which is ready to use the processing resource, this instruction from the T0 buffers will be selected and dispatched. If the processing resource is available, but there is no available instruction in the T0 buffers which can use that resource, the decode dispatch unit will select an available instruction from the T1 buffers 306, if such an instruction exists, and failing that, select an available instruction from the T2 buffers 307, if such an instruction exists. A processing resource is not always available to receive a new instruction with each cycle. Pipelines sometimes stall and/or may need to be flushed and restarted, which may cause the pipeline to be unavailable for one or more cycles. Furthermore, the fact that an instruction is in one of registers 204 does not mean that it is available to execute. There may be other preceding instructions which program logic requires execute first (although in many cases it is possible to execute multiple instructions concurrently or out of sequence without corrupting the program logic).

Instructions within each executing thread are grouped in groups of non-dependent sequential instructions. When instructions are loaded into buffers 204 from L1 I-Cache 201, dependency check unit 308 automatically analyzes the instruction stream to determine which instructions can be executed concurrently or out of sequence. The dependency check unit divides the instruction stream into groups of sequential instructions by placing a stop bit at the last instruction of each group. Within any group, the instructions have no dependencies and can safely be executed out of sequence. Specifically, with respect to each instruction, the dependency check unit determines whether there is some dependency upon completion of a previous instruction in the same group. Dependency depends on the type of instruction and the operand(s). Where two different instructions reference the same operand, this often, but not always, creates a dependency. E.g., if both instructions use the same operand as a source for data which is read or input to some pipeline, no dependency exists. But if a first instruction writes to an operand location and a second instruction reads from the same location, the second instruction is clearly dependent on the first, and can not be executed before or simultaneously with the first instruction. If a dependency is found within the same group, the dependency check unit places a stop bit in the immediately preceding instruction, so that the instruction being analyzed will be part of a separate group. When decode/dispatch unit 303 selects instructions for dispatch, it won't proceed beyond a group (as indicated by a stop bit) until all the previous instructions have been dispatched.

Because the T0 thread registers are reserved for use by threads of the special class (while the remaining register sets can be used by any type of thread), most of the time there is no active T0 thread executing in the processor, and the T0 register sets spend most of their time idle. When there is no active T0 thread, decode/dispatch unit 303 will generally select instructions from the T1 thread for dispatch, and sometimes select T2 thread instructions where hardware resource is available and no T1 thread instruction can be dispatched to fill it. When a T0 thread is active, it takes priority over the others, and T1 and T2 threads are consequently dispatched with significantly less frequency. In this mode, the T2 thread, being the lowest priority, might rarely or never get its instructions dispatched, but its state remains in its register set, ready to resume more frequent execution when the T0 thread relinquishes the processor.

While various CPU components have been described and shown at a high level, it should be understood that the CPU of the preferred embodiment contains many other components not shown, which are not essential to an understanding of the present invention. Furthermore, it will be understood that the CPU of FIG. 3 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays sets; dedicated floating point hardware may or may not be present; etc. Furthermore, CPU 101 may have a simple or complex instruction set.

In the preferred embodiment, the T0 threads are restricted to using a portion of certain caches. The reason for this restriction is that a T0 thread, operating at a high priority, will tend to flush the cache and replace its contents with its own data. After brief execution, the T1 and T2 threads then must refill the cache with their data. However, the T0 thread typically doesn't need as large a cache space as the other threads. Its working set is typically smaller. If unrestricted, it will cause the least recently used cache lines to be evicted; usually, these are the lines associated with other threads. But if the T0 thread is restricted to some portion of the cache (which is still large enough to provide an adequate working set), it ends up evicting its own cache lines, which it no longer needs, rather than older cache lines which will be needed in the future by the other threads.

Generally, the effect of flushing caused by a high priority thread is greater at the higher cache levels. Because the T0 thread typically does not require a lot of data, the larger, lower level caches are unlikely to be significantly flushed even if unrestricted. Therefore, in the preferred embodiment, only the L1 caches are restricted, i.e., the T0 threads are restricted to a portion of the L1 caches only, and are not restricted to any portion of the L2 or L3 caches. It would alternatively be possible to restrict the T0 threads to some appropriate portion the L2 and/or L3 caches.

Figure 4:
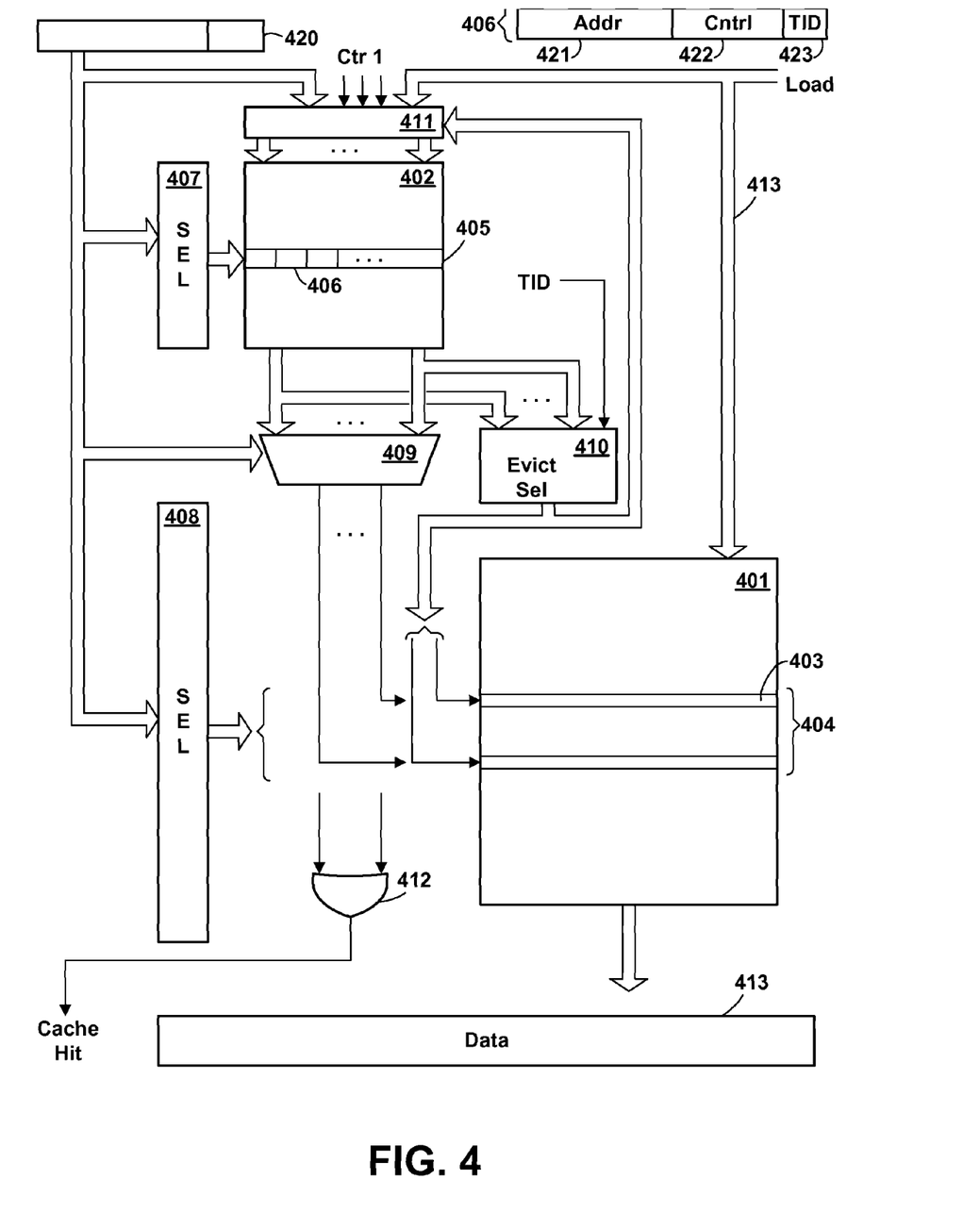
FIG. 4 is a representation of the general structure of a cache including associated accessing mechanisms, according to the preferred embodiment.

FIG. 4 is a representation of the general structure of a cache including associated accessing mechanisms, according to the preferred embodiment. FIG. 4 could represent any of either L1 I-cache 201, L1 D-cache 202, L2 cache 203, or L3 cache 204, although in the preferred embodiment the eviction selection logic 410 is different in the L1 caches, as explained further herein.

As is known in the art, a cache is accessed by decoding an identification of an associativity set from selective address bits (or in some cases, additional bits, such as a thread identifier bit), and comparing the addresses of the cache lines in the associativity set with the desired data address. For example, where there are 1K associativity sets in a cache, 10 bits are needed to specify a particular associativity set from among the 1K. Ideally, these 10 bits are determined so that each associativity set has an equal probability of being accessed. In the preferred embodiment, L1 caches 201, 202 are addressed using effective addresses, while L2 cache 203 and L3 cache 204 are addressed using real addresses. Therefore, in order to access L2 or L3 caches, an effective address generated by the processor is first translated to a real address by address translation hardware 321. Alternatively, as is known in some computer system designs, it would be possible to access all cache levels using real addresses, or to access some or all of the caches below L1 using virtual or effective addresses, without translation.

Referring to FIG. 4, a cache comprises a cache data table 401 and a cache index 402. The data table 401 contains multiple cache lines of data 403 grouped in associativity sets 404. In the preferred embodiment, each cache line 403 is the same size in all of the caches, although this need not be the case. A cache line is the smallest unit of data which can be brought into the cache or evicted from the cache. A typical cache line size is 128 bytes, although this could vary. The number of cache lines in each associativity set 404 typically varies, this number being greater for lower level caches. For example, L1 caches might contain eight cache lines in each associativity set, while L2 and L3 caches have sixteen lines in each associativity set, it being understood that these are merely representative parameters which may vary.

Index 402 contains multiple rows 405 of index entries 406, each row 405 corresponding to a respective associativity set 404 of data table 401 and containing a number of index entries 406 equal to the number of cache lines 403 in the associativity set 404. Each index entry 406 contains at least a portion of an address 421 of a corresponding cache line 403, certain control bits 422, and a thread identifier 423. Address portion 421 could be a portion of a real or effective address, depending on which is used to access the cache. Control bits 422 may include, but are not necessarily limited to: a modified bit; an invalid bit; one or more bits for selecting a cache line to be evicted where necessary, such as least-recently-used (LRU) bits; one or more bits used as semaphores; locks or similar mechanisms for maintaining cache coherency; etc., as are known in the art.

A cache line is referenced by selecting a row 405 of index 404 corresponding to some function of a portion of the address 420 of the desired data (herein called the reference address), using selector logic 407. This function is selected to achieve an approximately equal distribution of data references among the various associativity sets. Often, this function is a direct decode of the N bits of reference address at bit positions immediately above the M lowest bits corresponding to the cache line size. For example, for a cache line size of 128, or $2^7$, M is 7). N depends on the number of associativity sets in the cache, and is sufficiently large to select any associativity set. Generally, this means that N is the base 2 log of the number of associativity sets. I.e., for a cache having 1024 associativity sets, N is 10. However, more complex hashing functions could alternatively be used, which could include bits outside an address, such as a thread identifier. Furthermore, the functions need not be the same for all caches; a direct decode may be used for one cache while a more complex hashing function is used for another. The reference address contains more than (N+M) bits, so that multiple addresses map to the same associativity set.

The selective bits of reference address are input to selector logic 407, which generates a selection signal to select a single row 405 of the cache index 402. The address 411 in each respective index entry 406 of the selected row 405 is then compared with the reference address 420 by comparator logic 409. In fact, it is usually only necessary to compare some portion of the reference address which was not used by selector 407, since the bits used by selector 407 inherently compare by virtue of the row selection. If there is a match, comparator logic 409 outputs a selection signal corresponding to the matching one of the index entries. Selector logic 408 selects an associativity set 404 of cache lines 403 using the same reference address bits used by selector 407, and the output of comparator 409 selects a single one of the cache lines 403 within the selected associativity set. The selected line is the data output 413 of the cache. The various selection lines output by comparator 409 are logically ORed by OR gate 412 to produce a cache hit signal. I.e., if the output of OR gate 412 is active, a cache hit has been detected and the data output 413 can be considered valid; if the output of OR gate 412 is not active, there has been a cache miss.

Although selectors 407 and 408 are shown in FIG. 4 as separate entities, it will be observed that they perform identical function. Depending on the chip design, these may in fact be a single selector, having outputs which simultaneously select both the index row 405 in the index 402 and the associativity set 404 in the cache data table 401.

When a data reference to the cache produces a cache miss (the required data is not in the cache), it is generally necessary to load the required data from a lower level cache or from main memory 102. Depending on the system design, it is sometimes also possible to load data to cache prospectively, although this is usually done only for lower level caches, and not for the L1 cache. When a new cache line is to be loaded into cache, it is necessary to select an existing line to be replaced ("evicted" from the cache). Selection is performed by eviction selection logic 410.

A line being evicted must necessarily belong to the same associativity set as the line which will replace it. A line is selected for eviction by selecting the appropriate row 405 of cache index 402 using selector 407, and inputting selective control bits 422 and thread identifier 423 of each entry 406 to eviction selection logic 410. Eviction selection logic 410 outputs a selection signal, which is used to select a cache line 403 of an associativity set 404 for writing out of cache data table 401, or for loading a new cache line into the cache data table from load bus 413. When loading a new cache line, the output of eviction selection logic 410 also drives write selector 411, which selects an entry 406 of a row 405 of cache index for writing data from load bus 413, address 420, or other control information applicable to the newly loaded cache line.

In the preferred embodiment, for at least one of the caches, eviction logic 410 effectively limits the number of cache lines in each associativity set which may be filled by the T0 thread. This number is referred to as the T0 limit (T0L), and it is necessarily less than the number of cache lines in each associativity set. An external signal (T0) indicates to the eviction logic whether the thread which requested the new cache line is the T0 thread. If not, the eviction logic selects any cache line of the associativity set for eviction, according to any appropriate eviction algorithm. Numerous such algorithms exist in conventional art, and any such algorithm, now known or hereafter developed, could be used. If the T0 thread requested the new cache line, and if there are already T0L cache lines in the associativity set which are filled by thread T0, then the eviction logic is constrained to evict one of the cache lines which were filled by thread T0. In this manner, the number of lines in the cache which were filled by thread T0 can not exceed T0L.

Eviction logic 410 can easily implement this restriction by altering an eviction priority under certain circumstances. Normally, eviction logic 410 derives a priority for each cache line of a selected associativity set, and selects a low priority line for eviction. The priority is normally derived from certain bits of control field 422, such as LRU bits which indicate recency of reference, invalid bit, etc., according to any of various known techniques or techniques hereafter developed. This priority (Std_Priority) is modified if the new cache line is being refilled by thread T0 and there are already T0L or more cache lines in the associativity set which were filled by T0. The modified priority assigned to each cache line may be expressed as follows:

```
IF (Σ Cache_Line_T0(i) + New_Line_T0 > T0L) AND
    (Cache_Line_T0(S) = 0)
THEN Priority_Cache_Line(S) = MAX
ELSE Priority_Cache_Line(S) = Std_Priority_Cache_Line(S)
``` where New_Line_T0 is 1 if the thread which is filling the new cache line is a T0 thread and zero otherwise; Cache_Line_T0 (i) is 1 if cache line i was filled by thread T0, and 0 otherwise (the summation being made across all cache lines i in the associativity set); MAX is a highest possible priority; Priority_Cache_Line(S) is the modified priority of cache line S, and Std_Priority_Cache_Line(S) is the unmodified priority of cache line S based on LRU, invalid and/or other control bits. Preferably, MAX is a special high priority level which is higher than any other level, although it could alternatively be the highest level based on LRU (i.e., a level equivalent to the most recently accessed cache line). It would alternatively be possible to modify the above expression by adding the additional condition that cache line S must be valid to receive the MAX priority. This additional condition might allow an invalid cache line to be replaced by a cache line requested by thread T0, and therefore in limited circumstances the cache lines filled by thread T0 might exceed the T0L limit.

As described above, threads of a special class execute using the T0 register set in processor 101. It will be observed that there is nothing in the processor itself which would prevent any type of thread from executing in the T0 register set. The processor relies on the operating system to identify threads of the special class which should execute in the T0 register set. The operating system's dispatcher separately records thread type and indicates to the processor the register set in which a dispatched thread should execute.

Figure 5:
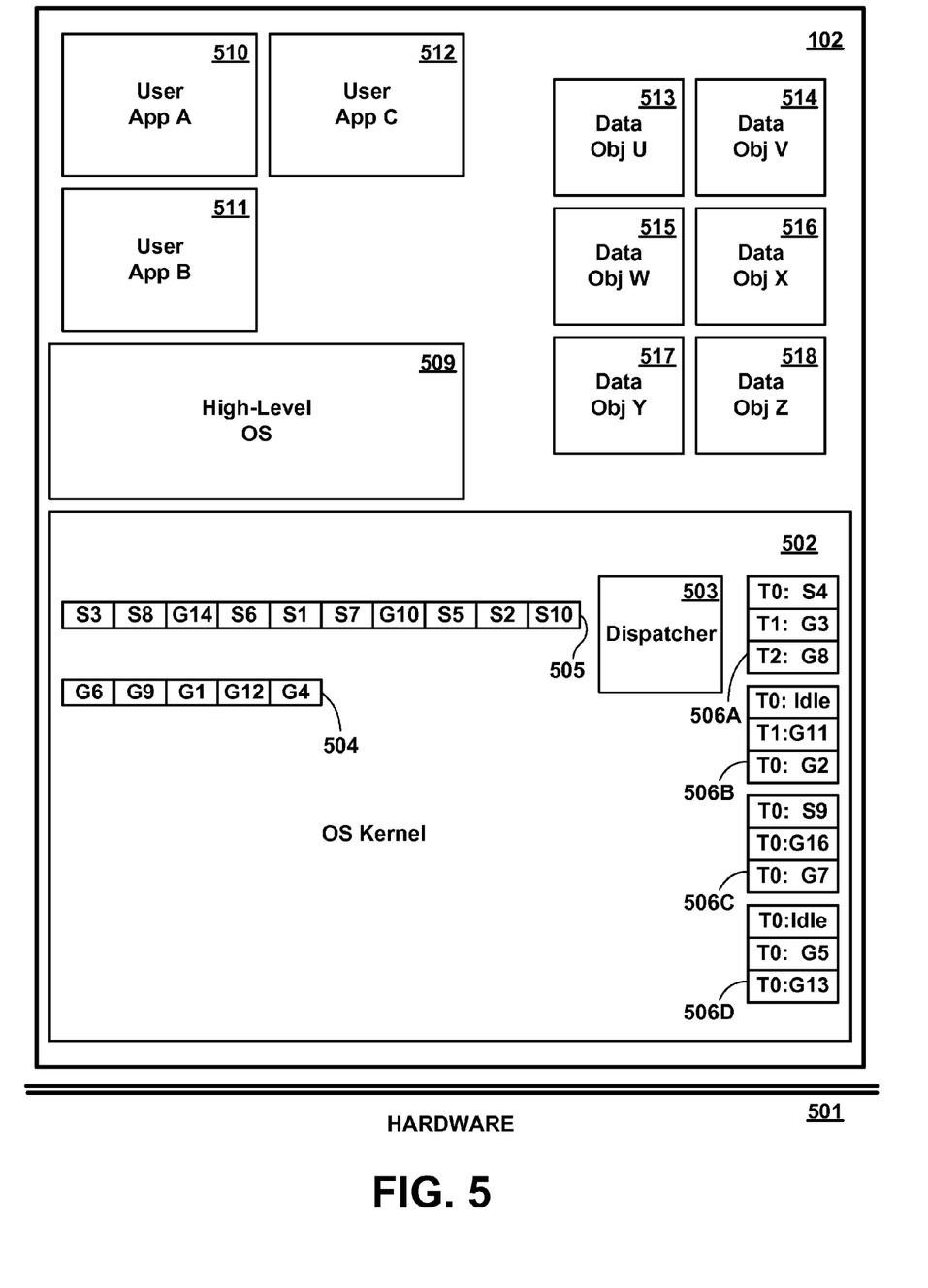
FIG. 5 is a conceptual illustration showing certain major software components of memory 102 and the division of hardware and software function at different levels of abstraction in a computer system, according to the preferred embodiment.

FIG. 5 is a conceptual illustration showing certain major software components of memory 102 and the division of hardware and software function at different levels of abstraction in computer system 100. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through operating system code and ultimately to data bits which get put in machine registers to force certain actions. At a very low level, changing electrical potentials cause various transistors to turn on and off. In FIG. 5, the "higher" levels of abstraction are represented toward the top of the figure, while lower levels are represented toward the bottom.

Hardware level 501 shown in FIG. 5 represents the physical processors, memory, buses, and other components which cause instructions to be executed. As used herein, hardware level 501 represents the collection of physical devices (as opposed to data stored in devices) shown in FIGS. 1-4, including other hardware not shown in FIGS. 1-4.

Immediately above hardware is low-level operating system level 502, which in some operating systems is called a "kernel". In a physical sense, the operating system is code, i.e., it is data in the form of instructions which is stored in various memory locations and executed on one or more processors to perform the required function. The low-level operating system provides certain base operating system function needed to share system resources, allocate memory, enforce security, and so forth. Among the functions provided by low-level operating system 502 is a thread dispatching function 503. Dispatcher 503 dispatches threads waiting to be executed to processors for execution, as explained in greater detail herein. Associated with dispatcher 503 are a ready queue data structure 504 containing threads ready to execute and waiting for dispatch by dispatcher 503; a wait queue data structure 505 containing instantiated threads which are not immediately ready to execute, i.e., that are waiting for some event (such as completion of an I/O operation) to occur before they can be dispatched to a processor for execution; and execution state data structures (represented as entities 506A-506D, and referred to herein generically as feature 506) which records the threads which are currently executing in each respective processor 101A-101D.

Above the level of low-level operating system 502 are various user applications 510-512 and user data objects 513-518. The system may optionally include additional higher-level operating system functions 509. In general, higher-level operating system functions 509 provide additional capabilities and functions to users who wish to access them, but a user process may directly access the low-level operating system 502 for execution.

Thread dispatching depends on the state and priority of the threads. At any instant in time, a thread is in one of several states. For example, a thread may be in an executing state, in which it has been dispatched to a processor for execution, an event wait state, in which it can not execute until the occurrence of some external event and is therefore waiting for the event to occur, or a ready state, in which the thread is ready to execute and is waiting only for an available processor. Depending on the operating system, additional states or refinements of the above states may be defined. Additionally, a priority of execution is typically associated with each thread. Any of various priority assignment schemes known in the art or hereafter developed may be used. The priority is typically assigned by the user, system administrator, or operating system itself. E.g., the priority of a user application process is often a default priority for user processes specified by the operating system, subject to override by the user. The priority may be fixed for the duration of the thread's existence, or may be adjustable depending on various factors, such as the length of time the thread has been waiting in the ready queue.

In the preferred embodiment, among the state information carried by each thread or group of threads is whether the thread or group is a member of a "special class" of threads. This information could be carried as a single bit, although it would alternatively be possible to have multiple special or other classes of threads requiring multiple bits of state information.

Membership in the special class is preferably designated by any of various alternative techniques. For example, the operating system could automatically assign certain kernel threads to the special class based on same thread attribute or combination of thread attributes. It may even be possible for the operating system to dynamically assign threads to the special class based on observed behavior, such as the quantity of instructions or time it executed when previously dispatched. Membership may be a fixed attribute of the code, which is manually specified by a user and assigned at compilation time, build time, load time, or other time in advance of instruction execution. Since it may be undesirable to allow any arbitrary user to specify that his code or portions thereof execute as a special class thread, special tools, available only to authorized persons, are preferably used to designate membership in the special class.

In general, it is expected that special class threads will be low-level operating system functions rather than user application code. Threads not designated as belonging to the special class are considered "general class" threads. In FIG. 5, special class threads are represented as "S"N, and general class threads are represented as "G"N, where N is an integer.

Thread ready queue structure 504 and thread wait queue structure 505 identify a variable number of threads, and data therein may be structured according to any appropriate conventional form. These queue structures are represented in FIG. 5 as respective single lists or queues, although in fact either may comprise multiple lists separated according to priority or other considerations. As represented in FIG. 5, the threads on the ready queue 504 are typically general class threads, since special class threads tend to be dispatched immediately; the wait queue 505 typically contains a mixture of special class threads and general class threads.

A thread remains on wait queue 505 until some event on which it was waiting occurs. At that point, the thread is transferred to ready queue 504. Dispatcher 503 selects threads for dispatching from ready queue 504. Typically, threads are selected according to priority, and among threads of equal priority, the thread which has been in the ready queue longest is selected first. However, other considerations could be used. For example, in some systems such as non-uniform memory architecture (NUMA) systems or systems which are logically partitioned, separate queues might be maintained for different processors or groups of processors within the system and/or threads dispatched based on some form of association with a processor or group of processors. Furthermore, although the present system has been described as having a single operating system and dispatcher which dispatches threads of the special class to the T0 register set, a computer system might be partitioned into multiple logical partitions, each containing its own respective operating system and dispatcher, and in this case a dispatcher which selects threads of the special class for dispatch to the T0 register set might be present in one, some or all of the logical partitions.

Execution state data structures 506 record the threads executing in each register set of each processor. For example, as shown in FIG. 5, data structure 506A, which is associated with processor 101A, records thread "S4" in the T0 thread register set, thread "G3" in the T1 register set, and thread "G8" in the T2 register set. Generally, the T1 and T2 register sets are busy, and so general class threads will be waiting on ready queue 504. However, in general most of the special class threads will be waiting on wait queue 505, and only a few will be executing at any given moment. Typically, the number of executing special class threads will not exceed the number of processors, i.e., the number of T0 register sets. As shown in FIG. 5, T0 register sets for processors 101B and 101D (as recorded in execution state data structures 506B and 506D, respectively) are idle.

Threads of the general class are dispatched from ready queue 504 only to an available T1 or T2 register set, and never to a T0 register set, even if one is idle. When a T1 or T2 register set in any processor becomes available (either because an executing thread relinquishes the processor, or is pre-empted), dispatcher 503 chooses a thread from ready queue 504 and dispatches it to the processor. If a T1 register set becomes available, the dispatcher may cause the processor to switch the existing T2 thread to the T1 register set, and dispatch the enqueued thread to the T2 register set. Generally, a thread dispatched from the ready queue to a T1 or T2 register set is a general class thread, although in rare cases it might be a special class thread, as discussed below.

When an event occurs which causes a thread waiting on the wait queue 505 to become ready to execute, the thread is transferred to ready queue 504. If the thread is a special class thread, it is usually a high priority thread and goes to the head of the ready queue for immediate dispatch. A special class thread is dispatched to a T0 register set, if there is one available. Usually, there will be at least one T0 register set available, to which the special class thread is immediately dispatched. In rare circumstances, all of the T0 register sets may be busy. If this happens, the special thread may be dispatched to a T1 register set (or even a T2 register set). Because the special class thread has a high priority, it will typically pre-empt an existing general class thread, and be dispatched immediately to a T1 register set in these circumstances. If a special class thread is dispatched to a T1 register set, it executes in the T1 set just as any general class thread would, and is not restricted to some subset of the cache lines in the L1 caches (as a thread executing in the T0 register set would be). An operating system tuning parameter controls whether a special thread may be dispatched to the T1 and T2 logical processors.

Various software entities are represented in FIG. 5 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 5, it will be understood that the actual number of such entities may vary, and in particular, that in a complex multi-processor system environment, the number and complexity of such entities is typically much larger.

While the software components of FIG. 5 are shown conceptually as residing in memory 202, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 5 is not meant to imply any particular memory organizational model, and that system 100 might employ a single address space virtual memory, or might employ multiple virtual address spaces which overlap.

The embodiment of the present invention herein described, with one high priority but cache limited hardware thread and two hardware regular threads, can best be compared to a processor with three regular threads. For the purpose of comparison, the situation in which there are two or three CPU compute-intensive application threads and several I/O intensive threads is considered. The I/O intensive threads could be doing asynchronous I/O in behalf of the compute-intensive applications and/or be performing utility functions such as copying files from one device to another.

In the case of a three-threaded conventional processor without the designation of a special register set, in order to dispatch a high priority I/O thread, the operating system performs a "context switch," saving the state of one of the three running compute-intensive threads and then restoring the state of the I/O thread. While it is running, if the I/O thread copies a block of data from one memory buffer to another, it will flush out much if not all the compute threads' data from cache. The two still-running compute intensive applications are significantly slowed down by I/O thread's sweep of the cache. When the I/O thread enters a wait state, the operating system performs another context switch, saving the state of the I/O thread and restoring the state of the ready-to-run compute intensive thread. Now all three of the compute threads are running, but sluggishly, since they all repeatedly experience cache misses and these cache misses cause instructions to take more clock cycles to execute.

By comparison, the preferred embodiment avoids saving/restoring of compute-intensive thread context due to dispatching an I/O thread. It also avoids the cache misses inflicted by the I/O thread upon the compute threads.

In a system busy with many concurrent I/O threads, there will be many context changes involving the I/O threads, as they become dispatchable after an I/O interrupt. In the embodiment of the invention, they will preferably exploit the high priority hardware thread rather than the general purpose threads.

Where there are two or three compute intensive application threads, with the preferred embodiment, none experiences interruption and context switches to service the I/O intensive threads. Where there are three compute-intensive application threads, if two or more share the same application priority, there are however, interruptions and context switches among them by the operating system as it time-shares system resources among these application threads.

These problems are generally more acute in the case of a conventional processor supporting only two threads.

In the preferred embodiment, eviction selection logic in the cache operates to limit the number of cache lines which can be filled by a T0 thread by preferentially evicting T0-filled-lines when the number of T0-filled-lines is at a predetermined limit T0L. This embodiment has the advantage of simplicity of implementation, and is flexible enough to allow all cache lines to be used by non-T0 threads when there is no active T0 thread. However, there are various alternative ways to limit the number of cache lines used by a T0 thread. For example, a fixed subset of lines in each associativity set could be reserved for the T0 threads, which could not use any other cache lines. Such a subset could be reserved exclusively for T0 threads, or could be used by other threads when there is no active T0 thread. Alternatively, the T0 thread might have its own separate cache at the same level, which is not accessible to the other threads. The isolation provided by a separate cache may, in some circumstances, provide better performance notwithstanding the inability of the T1 or T2 threads to use the extra cache lines dedicated to the T0 thread.

In the preferred embodiment, threads of a special class are dispatched to a dedicated high priority register set, and are constrained to utilize only a subset of cache lines in a cache. However, it would alternatively be possible to utilize only one of these features, independently of the other. For example, a special high priority register set might be set aside for the special class threads, without placing any restrictions on the number of cache lines it could utilize. Alternatively, it would be possible to provide a restriction on the number of cache lines which can be filled by threads of a certain class, without providing a special register set for such threads.

In the preferred embodiment, threads of a special class utilize a dedicated, high priority set of registers which are unavailable to general class threads, and are constrained to utilize only a subset of cache lines in a cache. However, it would alternatively be possible to provide other forms of asymmetric hardware resource support for threads of the special class. For example, in general it is expected that threads of the special class do not perform extensive floating point or vector operations. If a processor contains vector or special floating point pipelines and other logic for efficiently performing floating point operations, including vector and floating point registers to supporting such operations, it may be possible in some processor designs to omit such registers in the T0 register set. Such an omission would achieve a small reduction in hardware resources required for supporting the T0 register set, although it might require that the compiler be able to compile T0-eligible threads in a special mode which uses no floating point instructions. Additional hardware reductions or modifications for the T0 register set may be possible.

As described herein, a multithreaded processor supports the concurrent execution of N threads, where N is preferably 3. However, the choice of N could depend on many design factors, and could be a number other than 3. As processors become more capable, it is possible that design considerations will favor a larger number of threads. Furthermore, although in the preferred embodiment a single register set is reserved for threads of the special class, the number of register sets reserved for threads of the special class could conceivably be higher than one.

In general, the software routines executed to implement certain illustrated embodiments of the invention, whether implemented as part of an operating system kernel or otherwise, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A digital data processing device, comprising:
    a processor for executing threads including threads of a special class and threads not belonging to said special class, said processor containing a plurality of register sets for supporting the maintenance of thread state and concurrent execution of a plurality of threads, each register set of said plurality of register sets corresponding to a respective thread;
    a memory for storing instructions executable by said processor;
    a cache having a plurality of cache lines for temporarily storing selective contents of said memory for use by threads executing on said processor, each cache line of said plurality of cache lines for temporarily storing respective selective contents of said memory on behalf of a respective thread executing on said processor; and
    a limiting mechanism which constrains the selection of a cache line of said cache into which to load data on behalf of a thread of said special class executing on said processor, the selection being constrained to select a cache line of said cache which will not cause the eviction, from said cache, of valid data originally stored in a cache line of said cache on behalf of a thread not belonging to said special class, and to prevent a thread of said special class from filling more than a predetermined limit of the cache lines of said cache with data stored on behalf of said threads of said special class, said predetermined limit being fewer than all of the cache lines of said cache.

2. The digital data processing device of claim 1, wherein said threads of a special class comprise high-priority input/output (I/O) bound threads.

3. The digital data processing device of claim 1, wherein each cache line of said cache is equally available to said threads of a special class; and
    wherein said limiting mechanism comprises a cache filling facility which restricts the number of said cache lines filled by said threads of a special class.

4. The digital data processing device of claim 3,
    wherein said cache comprises a plurality of associativity sets, each associativity set containing N cache lines, where N is an integer greater than one; and
    wherein said cache filling facility comprises eviction logic which selects cache lines for eviction from said cache, said eviction logic preferentially selecting a line filled by a thread of said special class for eviction from an associativity set when the total number of cache lines in the associativity set filled by threads of the special class equal or exceed a predetermined value less than N.

5. The digital data processing device of claim 1,
    wherein said cache is divided into a plurality of discrete fixed subsets of cache lines of said cache, each said fixed subset containing at least one respective cache line of said cache, at least one subset being available for use by threads of said special class and at least one subset being available for use only by threads not belonging to said special class.

6. The digital data processing device of claim 1,
    wherein said at least one cache comprises at least one cache at a first level and at least one cache at a second level, said first level being logically between said register sets of said processor and said second level, and
    wherein said limiting mechanism constrains the selection of a cache line of said cache into which to load data on behalf of a thread of a said special class executing on said processor, the selection being constrained to select a cache line of said cache which will not cause the eviction, from said cache, of valid data originally stored in a cache line of said cache on behalf of a thread not of said special class, and to prevent a thread of said special class from filling more than a predetermined limit of the cache lines of said at least one cache at said first level with data stored on behalf of said threads of said special class, said predetermined limit being fewer than all of the cache lines of said at least one cache at said first level, but does not so constrain the selection of a cache line of said at least one cache at said second level.

7. A digital data processor chip for use in a digital data processing system, comprising:
    a processor core for executing threads including threads of a special class and threads not belonging to said special class, said processor core containing a plurality of register sets for supporting the maintenance of thread state and concurrent execution of a plurality of threads, each register set of said plurality of register sets corresponding to a respective thread;
    a cache having a plurality of cache lines in one or more associativity sets for use by threads executing on said processor core, each said associativity set containing N cache lines, where N is an integer greater than one, each cache line of said plurality of cache lines of said cache for temporarily storing respective selective contents of a memory of said digital data processing system on behalf of a respective thread executing on said processor; and
    a limiting mechanism which constrains the selection of a cache line of said cache into which to load data on behalf of a thread of a special class executing on said processor core, the selection being constrained to select a cache line of said cache which will not cause the eviction, from said cache, of valid data originally filled in a cache line of said cache on behalf of a thread not belonging to said special class, and to prevent a thread of said special class from filling more than M of the cache lines in any said associativity set of said cache with data stored on behalf of said threads of said special class, where M is a predetermined integer less than N.

8. The digital data processor chip of claim 7, wherein said threads of a special class comprise high-priority input/output (I/O) bound threads.

9. The digital data processor chip of claim 7, wherein each cache line of said cache is equally available to said threads of a special class; and
wherein said limiting mechanism comprises a cache filling facility which restricts the number of said cache lines filled by said threads of a special class.

10. The digital data processor chip of claim 9,
wherein said cache comprises a plurality of said associativity sets; and
wherein said cache filling facility comprises eviction logic which selects cache lines for eviction from said cache, said eviction logic preferentially selecting a line filled by a thread of said special class for eviction from an associativity set when the total number of cache lines in the associativity set filled by threads of the special class equal or exceed M.

11. The digital data processor chip of claim 7,
wherein said cache is divided into a plurality of discrete fixed subsets of cache lines of said cache, each said fixed subset containing at least one respective cache line of said cache, at least one subset being available for use by threads of said special class and at least one subset being available for use only by threads not belonging to said special class.

12. The digital data processor chip of claim 7,
wherein said processor chip comprises at least one cache at a first level and at least one cache at a second level, said first level being logically between said register sets of said processor and said second level, and
wherein said limiting mechanism constrains the selection of a cache line of said cache into which to load data on behalf of a thread of a said special class executing on said processor core, the selection being constrained to select a cache line of said cache which will not cause the eviction, from said cache, of valid data originally stored in one or more cache lines a cache line of said cache on behalf of a thread not of said special class, and to prevent a thread of said special class from filling more than M of the cache lines in any said associativity set of said at least one cache at said first level with data stored on behalf of said threads of said special class, but does not so constrain the selection of a cache line of said at least one cache at said second level.

13. A method for operating a digital data processing device having a processor containing a plurality of register sets for supporting the maintenance of thread state and concurrent execution of a plurality of threads, each register set of said plurality of register sets corresponding to a respective thread, a memory, and a cache containing a plurality of cache lines in one or more associativity sets, each said associativity set containing N cache lines, where N is an integer greater than one, the method comprising the steps of:
designating threads of a subset of threads executed by said processor as threads of a special class, said subset comprising a plurality of threads executed by said processor, said subset being fewer than all the threads executed by said processor; and
performing a plurality of cache line load operations to load said cache lines of said cache with data stored in said memory, each cache line load operation being performed on behalf of a respective thread of said plurality of threads executed by said processor;
constraining the selection of a cache line of said cache into which to load data on behalf of a thread of a special class executing on said processor, the selection being constrained to select a cache line of said cache which will not cause the eviction, from said cache, of valid data originally stored in a cache line of said cache on behalf of a thread not belonging to said special class, and to prevent a thread of said special class from filling to fill more than M of the cache lines in any said associativity set of said cache with data stored on behalf of said threads of said special class, where M is a predetermined integer less than N.

14. The method of operating a digital data processing device of claim 13,
wherein said cache comprises a plurality of said associativity sets.

15. The method of operating a digital data processing device of claim 13, further comprising the step of:
preferentially selecting a cache line filled by a thread of said special class for eviction from said cache when the number of cache lines filled by said threads of said special class in at least one said associativity set would otherwise exceed M.

16. The method of operating a digital data processing device of claim 13, wherein said threads of a special class comprise high-priority input/output (I/O) bound threads.

17. The method of operating a digital data processing device of claim 13, wherein said threads not belonging to said special class are not prevented from filling all of said cache.

18. The digital data processing device of claim 1, wherein said threads not belonging to said special class are not prevented from filling all of said cache.

19. The digital data processor chip of claim 7, wherein said threads not belonging to said special class are not prevented from evicting valid cache line data filled on behalf of one or more threads of said special class to fill all of said cache.

* * * * *